(12) United States Patent
Cruz-Hernandez (10) Patent No.: US 10,366,584 B2
(45) Date of Patent: Jul. 30, 2019

(54) RENDERING HAPTICS WITH AN ILLUSION OF FLEXIBLE JOINT MOVEMENT

(71) Applicant: IMMERSION CORPORATION, San Jose, CA (US)

(72) Inventor: Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/613,556

(22) Filed: Jun. 5, 2017

(65) Prior Publication Data

US 2018/0350203 A1 Dec. 6, 2018

(51) Int. Cl.
*G08B 6/00* (2006.01)
*G06F 3/01* (2006.01)
*A63F 13/28* (2014.01)
*A63F 13/285* (2014.01)

(52) U.S. Cl.
CPC ............... *G08B 6/00* (2013.01); *A63F 13/28* (2014.09); *A63F 13/285* (2014.09); *G06F 3/011* (2013.01); *G06F 3/016* (2013.01); *Y10S 116/17* (2013.01)

(58) Field of Classification Search
CPC . G06F 3/011; G06F 3/016; G08B 6/00; Y10S 116/17; A63F 13/28; A63F 13/285
See application file for complete search history.

(56) References Cited

U.S. PATENT DOCUMENTS

| | | | |
|---|---|---|---|
| 8,981,915 B2 | 3/2015 | Birnbaum et al. | |
| 9,285,905 B1 * | 3/2016 | Buuck | G06F 3/041 |
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,760,166 B2 | 9/2017 | Ammi et al. | |
| 9,811,854 B2 | 11/2017 | Lucido | |
| 9,851,799 B2 | 12/2017 | Keller et al. | |
| 9,933,851 B2 | 4/2018 | Goslin et al. | |
| 9,948,885 B2 | 4/2018 | Kurzweil | |
| 2008/0153590 A1 | 6/2008 | Ombrellaro et al. | |
| 2013/0069862 A1 | 3/2013 | Ur | |

(Continued)

FOREIGN PATENT DOCUMENTS

| | | |
|---|---|---|
| EP | 2927783 A1 | 10/2015 |
| EP | 3093736 A1 | 11/2016 |
| WO | 2015185389 A1 | 12/2015 |

OTHER PUBLICATIONS

Thyrion C, Roll JP. Predicting any arm movement feedback to induce three-dimensional illusory movements in humans. J Neurophysiol 104: 949-959, 2010. <https://doi.org/10.1152/jn.00025.2010>.*

(Continued)

*Primary Examiner* — Laura N Nguyen (74) *Attorney, Agent, or Firm* — Miles & Stockbridge P.C.

(57) ABSTRACT

Rendering haptics includes applying a haptic effect proximate to a flexible joint of an individual using a haptic output device. In response, an illusion of joint movement is conveyed at the flexible joint of the individual.

18 Claims, 8 Drawing Sheets

(56) References Cited

U.S. PATENT DOCUMENTS

| | | |
|---|---|---|
| 2013/0198625 A1 | 8/2013 | Anderson et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0165567 A1* | 6/2017 | Walters .................. A63F 13/285 |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0232338 A1* | 8/2017 | Goslin .................. A63F 13/332 463/31 |
| 2017/0255263 A1* | 9/2017 | Letendre ................. G06F 3/016 |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2019/0060708 A1* | 2/2019 | Fung .................. A63B 24/0003 |

OTHER PUBLICATIONS

Roll JP, Albert F, Thyrion C, Ribot-Ciscar E, Bergenheim M, Mattei B. Inducing any virtual two-dimensional movement in humans by applying muscle tendon vibration. J Neurophysiol 101: 816-823, 2009. <https://www.physiology.org/doi/10.1152/jn.91075.2008>.*

Roll JP, Vedel JP. Kinaesthetic role of muscle afferents in man, studied by tendon vibration and microneurography. Exp Brain Res. 1982;47(2):177-90. [PMID:6214420] <http://dx.doi.org/10.1007/BF00239377>.*

Thyrion et al., "Predicting Any Arm Movement Feedback to Induce Three-Dimensional Illusory Movements in Humans", J Neurophysiol 104:949-959, 2010. First published Jun. 10, 2010; doi:10.1152/jn.00025.2010.

Duclos et al., "Complex muscle vibration patterns to induce gait-like lower-limb movements: Proof of concept", J Rehabil Res Dev. 2014;51(2):245-252; http://dx.doi.org/10.1682/JRRD.2013.04.0079; Nov. 2, 2014.

D. F. Collins et al., "Cutaneous Receptors Contribute to Kinesthesia at the Index Finger, Elbow, and Knee", J Neurophysiol 94:1699-1706, 2005. First published May 25, 2005; doi:10.1152/jn.00191.2005.

* cited by examiner

RENDERING HAPTICS WITH AN ILLUSION OF FLEXIBLE JOINT MOVEMENT

FIELD

Example embodiments are directed to rendering haptics, and more particularly, to rendering haptics with an illusion of flexible joint movement.

BACKGROUND

In conventional virtual-reality (VR)/augmented-reality (AR) systems, exoskeletons, grounded force-feedback devices (e.g., force-reflecting joysticks) or other similar mechanical systems are used to mimic movement that occurs in an VR or AR environment by forcing movement (such as bending, flexing, pushing, pulling, etc.) at a joint(s) of an individual. However, these devices and systems are bulky, and/or have mechanical hindrances that prevent them from simulating real (or natural) movement at joints. Furthermore, such systems and devices typically require that there is additional space around the individual to allow for the movement of the individual.

SUMMARY

One embodiment renders haptics with an illusion of complex flexible joint movement by applying a haptic effect proximate to a flexible joint of an individual. The haptic effect is applied using a haptic output device of a haptically-enabled system. The haptically-enabled system also includes a detector configured to receive an indication of an event and detect a movement-related interaction in the event. The haptic effect corresponds to the movement-related interaction and is obtained from a flexible joint haptic effects database.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Example embodiments are directed to rendering haptics with an illusion of flexible joint movement at a flexible joint of an individual.

Example embodiments are directed to rendering haptics with an illusion of complex flexible joint movement at a flexible joint of an individual without the use of complex and bulky mechanical devices.

Example embodiments are directed to rendering haptics to create the perception of real (or natural) flexible joint movement, thereby resulting in a more immersive experience without requiring complex movement of the flexible joint.

Example embodiments provide for rendering haptics with an illusion of complex flexible joint movement at a flexible joint of an individual by applying haptic effects that induce nominal flexible joint movement.

Haptics is a tactile and force feedback technology that generates haptic feedback effects (also known as "haptic feedback" or "haptic effects"), such as forces, vibrations, and motions, for an individual using the individual's sense of touch. A haptically-enabled device can include embedded hardware (e.g., actuators or other output mechanisms) configured to apply the haptic effects. The embedded hardware is, generally, programmed to apply (or playback) a particular set of haptic effects. When a signal specifying which haptic effect to play is received by the haptically-enabled device, the haptically-enable device renders the specified haptic effect. For example, when an individual is intended to experience a haptic event, the embedded hardware of the haptically-enabled device receives a play command through control circuitry. The embedded hardware then applies the appropriate haptic effect.

Example embodiments apply the haptic effects at a flexible joint to create the perception of neuromuscular stimulation. Neuromuscular stimulation is the stimulation of muscles and/or muscle afferents (nerve fibers) by an external source. Neuromuscular stimulation, traditionally, involves electrical or mechanical stimulation.

By applying the haptic effects with certain patterns and/or parameters proximate to a flexible joint of an individual, the haptic effects can create a perception of muscles in the flexible joint contracting or elongating (as experienced during complex flexible movement) by stimulating receptors (i.e., muscle spindles) within the muscles that detect movement through changes in the length of the muscle. Such as disclosed in the publication entitled "Complex muscle vibration patterns to induce gait-like lower limb movements: Proof of concept" by Duclos et al., the vibrations increase the discharge rate of muscle afferents that detect muscle lengthening to induce a perception of an illusory lengthening movement of the vibrated muscle.

Applying the haptic effects at a flexible joint of an individual can induce a gait-like movement (which is a sensation of gait) in the individual. Gait is a natural pattern or style exhibited by an individual during movement such as walking. In order to induce the desired gait-like movement, the haptic effects can be applied at or for (i) a desired frequency (e.g., about 1 Hz to 600 Hz, or about 80 Hz to 100 Hz), (ii) a desired duration (e.g., a vibratory pattern of constant vibration for about 1 sec or 2 sec or 4 sec followed by no vibrations for about 1 sec or 2 sec or 4 sec, or a combination of vibratory and deformation pattern of constant vibration for about 1 sec or 2 sec or 4 sec followed by constant deformation for about 1 sec or 2 sec or 4 sec), (iii) a desired number of cycles (e.g., about 1-60 cycles, or about 5-20 cycles, or about 10 cycles) and/or (iv) a desired amplitude (e.g., about 0.25 mm to 1 mm). Assuming a vibration at about 100 Hz and sinusoidal in shape, the acceleration is (by taking the second derivative of the sine) around 394.78 m/s$^2$, or about 40 gravities in acceleration. According to example embodiments, the haptic effects can be asymmetrically or symmetrically applied at the flexible joint.

The term "flexible joint" as used herein refers to a connection, which is made between bones or cartilage in a body, that is capable of achieving movement (abduction, adduction, extension, flexion and/or rotation) at a contact point between the bones, including synovial joints, and cartilaginous joints.

The term "complex movement" or "complex flexible joint movement" as used herein refers to flexible joint movements that occur in coordination during a normal pattern of movement (such as a gait).

Figure 1:
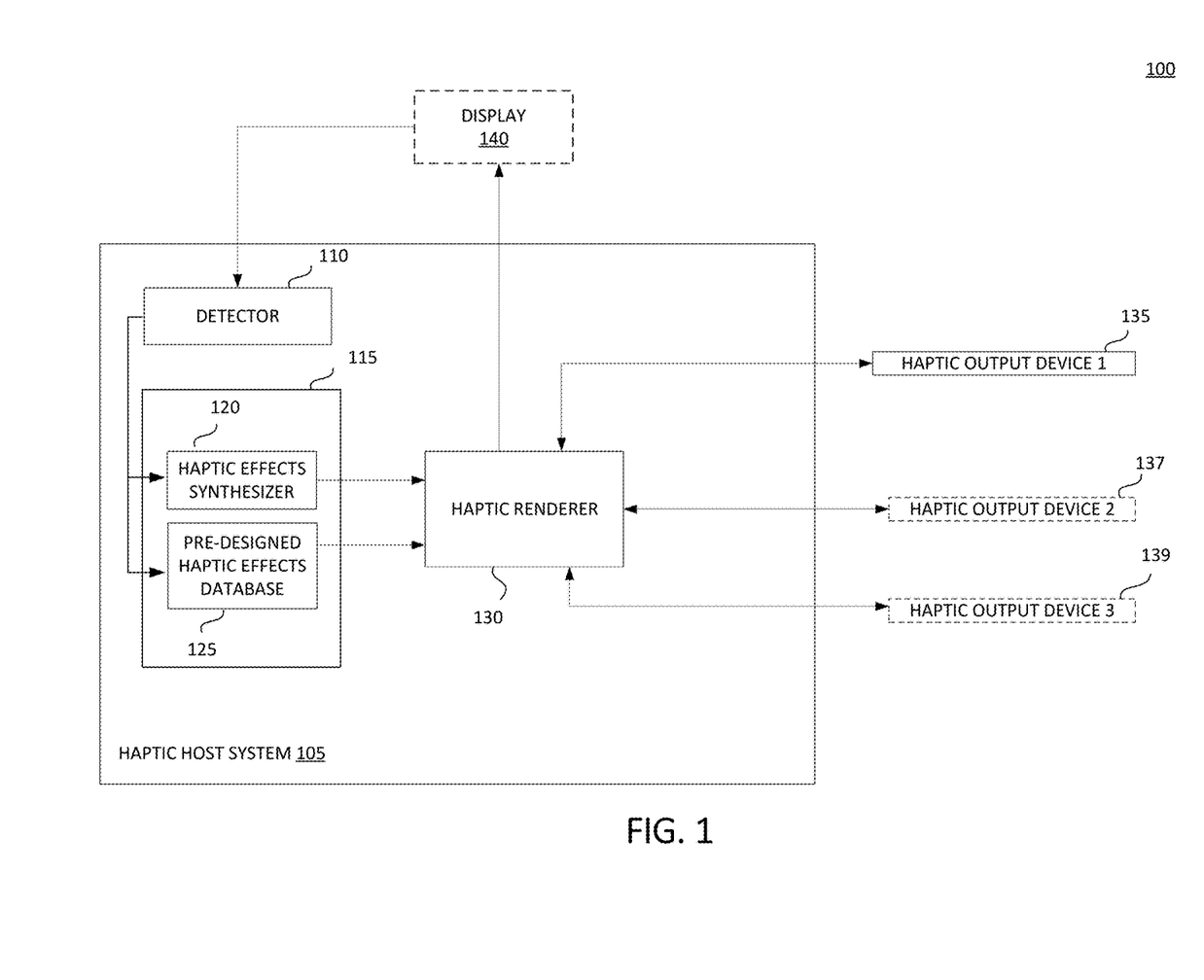
FIG. 1 is a block diagram of a haptic system according to an example embodiment.

FIG. 1 is a block diagram of a haptic system according to an example embodiment.

Referring to FIG. 1, a haptic system 100 includes a detector 110 that detects movement-related interactions in an event (or environment). Haptic system 100 further includes a flexible joint haptic effects database 115 from which haptic effects each corresponding to at least one of the movement-related interactions are obtained, and haptic output devices 135, 137, 139 that apply a haptic effect proximate to a flexible joint of an individual. The haptic effect conveys an illusion of complex flexible joint movement at the flexible joint of the individual. For example, an individual exploring a virtual reality environment in a jungle would feel as though his/her legs are moving with the same realism (e.g., resistance on hills, stepping on rocks, etc.) as experienced by an avatar in the virtual reality environment by applying haptic effects using haptic output devices worn proximate to the hip, knee and/or ankle of the individual. If the avatar fires a firearm, the recoil of the firearm can be conveyed to the individual by applying a haptic effect using haptic output devices worn proximate to the shoulder, elbow and/or wrist of the individual.

Haptic system 100 may also include a haptic renderer 130. Detector 110, flexible joint haptic effects database 115 and haptic renderer 130 may be in a haptic host system 105. Haptic host system 105 may be electrically connected to electromechanical actuators 135/137/139 positioned on the individual.

However, example embodiments are not limited thereto. For example, detector 110 may be separate from haptic host system 105.

The event may be an event occurring in real-time, an event occurring remotely, a virtual event or combinations thereof. For instance, the event may occur through a virtual reality system or an augmented reality system. In an example embodiment, haptic system 100 may be in a virtual reality system or an augmented reality system. As another example, the event may occur in real-time but from a remote location such as during the broadcast of a sports event. Thus, the event may occur during gaming, a sports event broadcast, surgery, or environments involving user navigation.

Detector 110 is configured to receive an indication of the event, and detect the movement-related interactions that occur in the event. In an example embodiment, detector 110 may detect the movement-related interactions from audio and/or visual cues during the event. The movement-related interactions may be any interaction related to movement such as throwing, kicking, catching, pushing, pulling, being pushed, being pulled, running, reaching, wobbling, etc. The movement-related interactions may be experienced by the individual, a robot, an avatar (a graphical representation of the individual), or combinations thereof.

One or more haptic effects that correspond to the movement-related interactions detected by detector 110 are obtained from flexible joint haptic effects database 115. The flexible joint haptic effects database 115 is a database of haptic effects used to render haptics that create a perception of complex movement (abduction, adduction, extension, flexion and/or rotation) achieved by flexible joints.

The haptic effects can be vibrotactile haptic effects, deformation haptic effects, electrostatic friction haptic effects, or a combination thereof. The haptic effects selected from flexible joint haptic effects database 115 may be synthesized (or created) using haptic creation tools and/or derived from a physics-based method in real time or non-real time in a haptic effects synthesizer 120. Alternatively, or in addition, the haptic effects selected from flexible joint haptic effects database 115 may be selected from a pre-designed haptic effects database 125.

Haptic effects synthesizer 120 may be controlled by a haptic creator. The haptic effects may be created in real-time (or simultaneously) as the event occurs, or after the event has occurred.

Movement-related interactions detected from the audio and/or visual cues may be haptified by using an audio or visual-to-haptics conversion algorithm. For example, an audio or video-to-haptics conversion algorithm as disclosed in U.S. Pat. No. 9,368,005 may be used. According to an example embodiment, only certain portions of the audio and/or visual cues may be haptified rather than entire cue(s). Therefore, example embodiments may use haptic conversion algorithms configured for those portions of the audio and/or visual cues to provide enhanced haptic metadata.

According to an example embodiment, a lookup table of the pre-designed effects may be stored in pre-designed haptic effects database 125. Upon selection, the pre-designed haptic effects can be modified or tuned to more specifically match the event by adding haptic effects, removing unusable haptic effects, or changing (or editing) at least one parameter (e.g., location, magnitude (or intensity), frequency, duration, etc.) of the haptic effects. The modification or tuning may be performed by a haptic editor (a person making an edit to the haptic metadata), haptic modification tools, etc.

According to an example embodiment, high level parameters that define a particular haptic effect include location, magnitude, frequency, and duration. Low level parameters such as streaming motor commands could also be used to render a select haptic effect. Some variation of these parameters can change the feel of the haptic effect, and/or can further cause the haptic effect to be considered "dynamic."

According to an example embodiment, a closed loop control system may be used to maintain the vibration at a specific frequency. A position sensor, an accelerometer, a pressure sensor, and a force sensor may be used to close the loop and control the frequency and magnitude of the vibration.

Haptic renderer 130 uses haptic-rendering algorithms to compute action/reaction forces in the movement-related interactions between, for example, the avatar and objects in the virtual environment, and action/reaction forces between the individual and haptic output devices 135/137/139. The haptic renderer 130 transmits a haptic signal associated with the haptic effect to haptic output devices 135/137/139.

The haptic effects are applied proximate to a flexible joint of the individual by at least one of haptic output devices 135/137/139. The haptic effects can be a vibrotactile haptic effect, a deformation haptic effect, an ultrasonic haptic effect, and/or an electrostatic friction haptic effect. Application of the haptic effects can include applying a vibration using a tactile, deformation, ultrasonic and/or electrostatic source.

Haptic output devices 135/137/139 can be electromechanical actuators including an actuator drive circuit. Electromechanical actuators, or other haptic output devices, may apply the vibration with a frequency of about 80 hertz to about 100 hertz.

Figure 2:
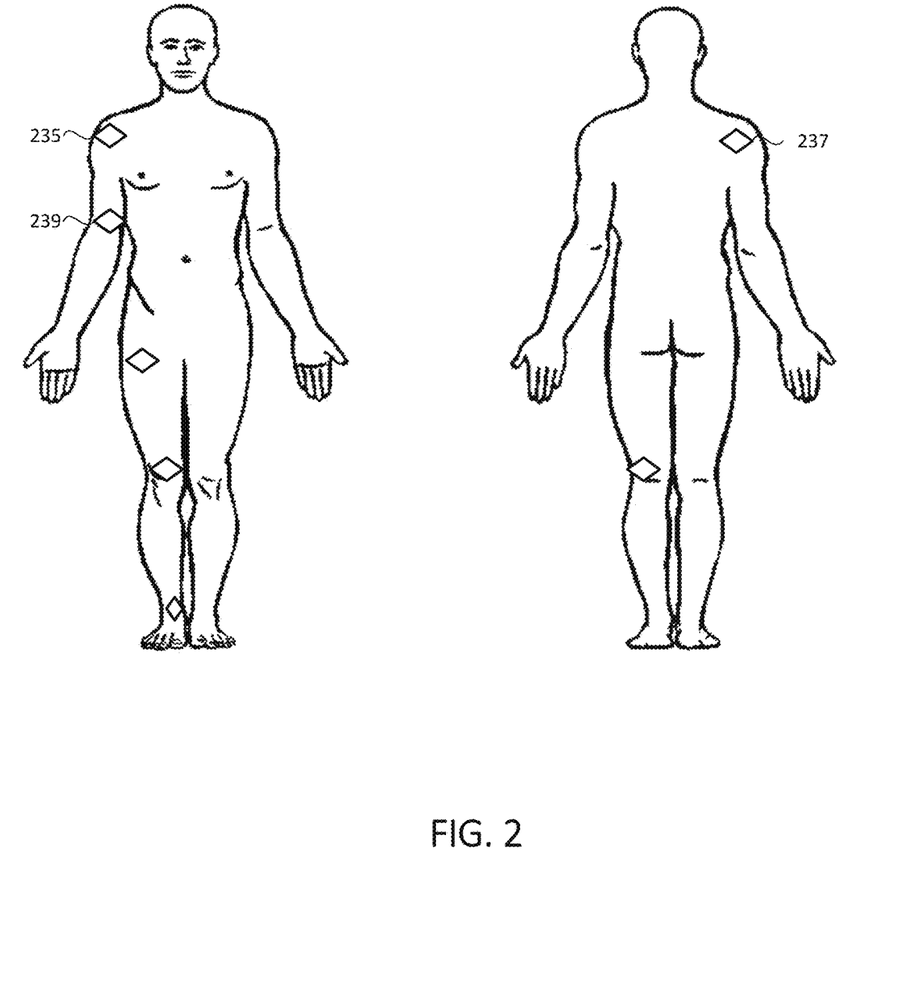
FIG. 2 is a diagram of an individual wearing haptic output devices according to an example embodiment.

FIG. 2 is a diagram of an individual wearing haptic output devices according to an example embodiment.

Referring to FIG. 2, haptic output devices 235, 237, 239 may be positioned proximate to a flexible joint (e.g., at the knee, elbow, shoulder, knuckles, wrist, ankle, pelvis, vertebral column, etc.) of the individual. In an example embodiment, more than one of haptic output devices 235, 237, 239 can be positioned proximate to a single joint. For example, first haptic output device 235 may be placed proximate to a flexor muscle of a right shoulder of the individual. First haptic output device 235 may apply a first haptic effect in a first pattern proximate to the right shoulder of the individual. Second haptic output device 237 may be placed proximate to an extensor muscle of the right shoulder. Second haptic output device 237 may apply a second haptic effect in a second pattern proximate to the right shoulder of the individual. The first and second haptic effects may collectively convey an illusion of flexible joint movement in two dimensions ("2D") or three dimensions ("3D") of the right shoulder.

In another example embodiment, first haptic output device 235 may be proximate to a first flexible joint (e.g., shoulder) on a right arm of the individual. First haptic output device 235 may apply a first haptic effect in a first pattern proximate to the right arm of the individual. Third haptic output device 239 may be proximate to a second joint (e.g., elbow) of the right arm of the individual. Third haptic output device 239 may apply a second haptic effect in a second pattern proximate to the right arm of the individual. The first and second haptic effects collectively convey an illusion of flexible joint movement in 2D or 3D of the right arm.

According to example embodiments, the first pattern may occur concurrently with, or overlapping, the second pattern. In an alternative embodiment, the second pattern may occur sequential to the first pattern.

According to example embodiments, the haptic output devices can be proximate to the flexible joint or a tendon of the flexible joint of an individual. A haptic output device that is proximate to the flexible joint or a tendon can be positioned at (i.e., direct on or over) the flexible joint or a tendon such that the individual perceives the haptic effect at the flexible joint. In an alternative example embodiment, a haptic output device that is proximate to the flexible joint can be placed near the flexible joint or a tendon such that the individual perceives the haptic effects at the flexible joint.

According to some example embodiments, the haptic output devices can be placed bilateral or perpendicular to the flexible joint or the tendon of the flexible joint of the individual.

According to example embodiments, the haptic output devices can be designed to fit the morphology of the flexible joint or tendon.

Figure 5:
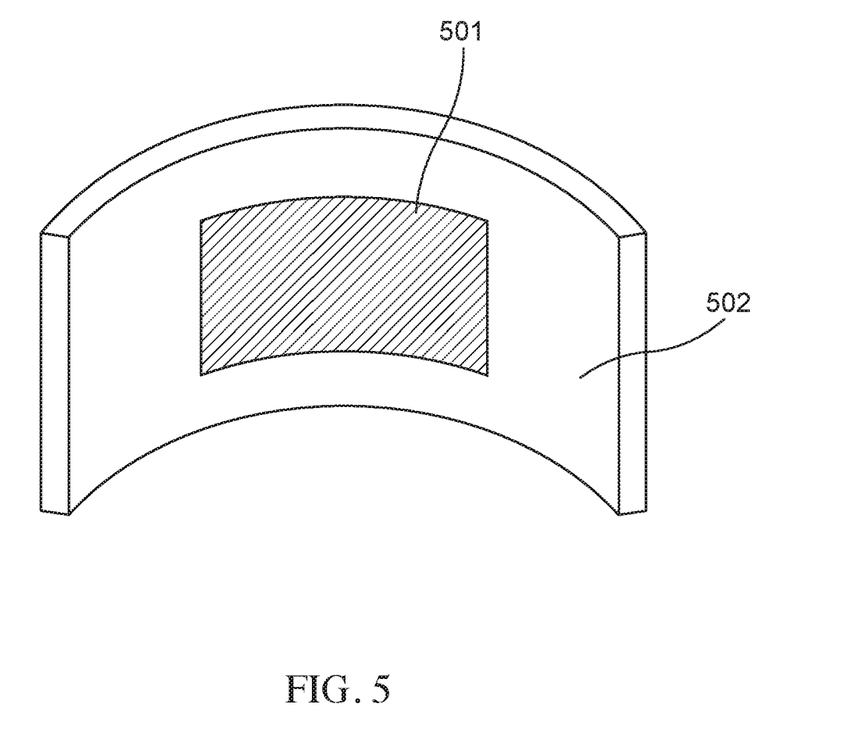
FIGS. 5, 6 and 7 are diagrams of haptic output devices according to example embodiments.
Figure 6:
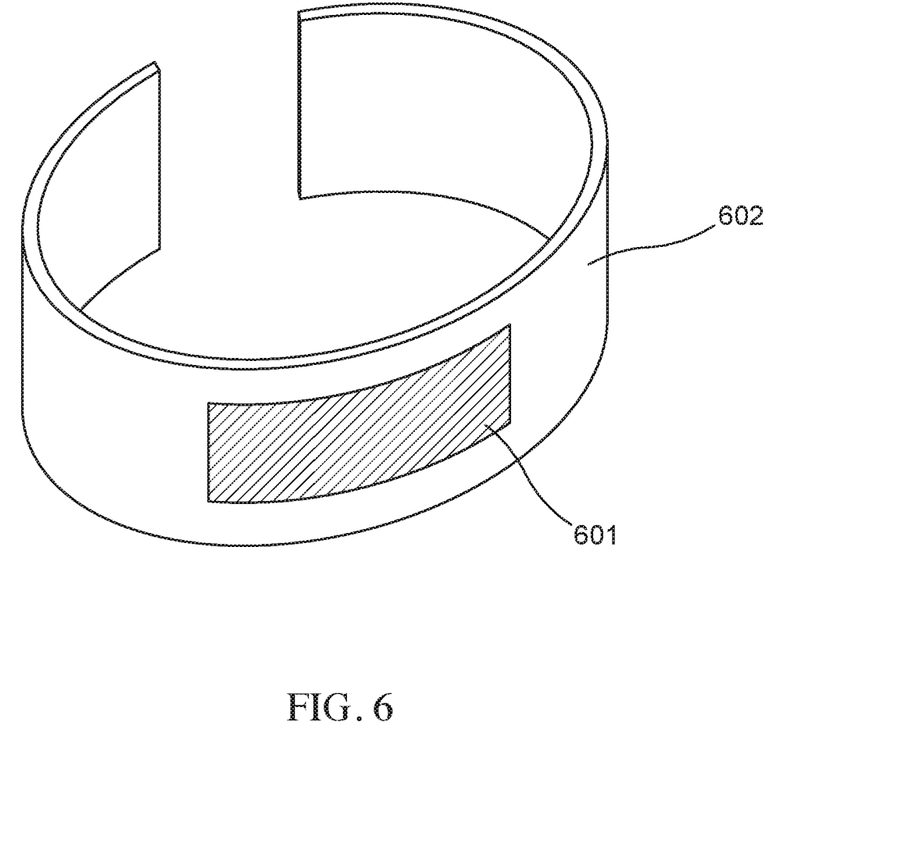
Figure 7:
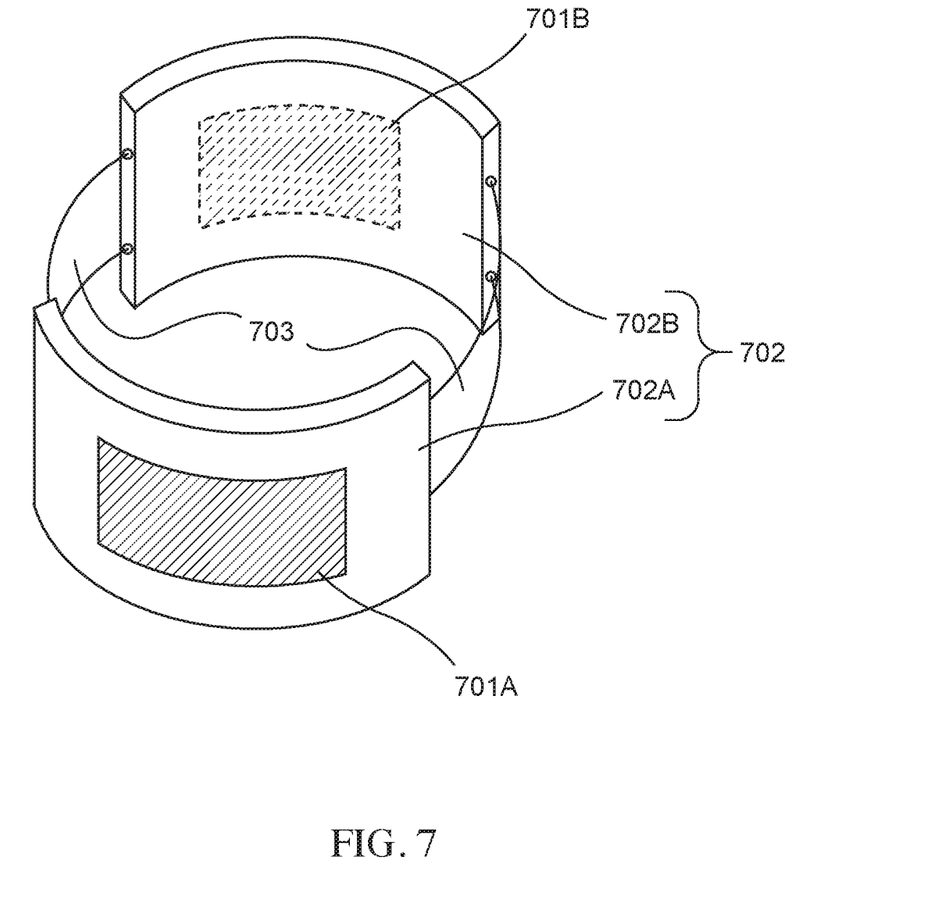

FIGS. 5, 6 and 7 are diagrams of haptic output devices according to example embodiments.

Figure 8:
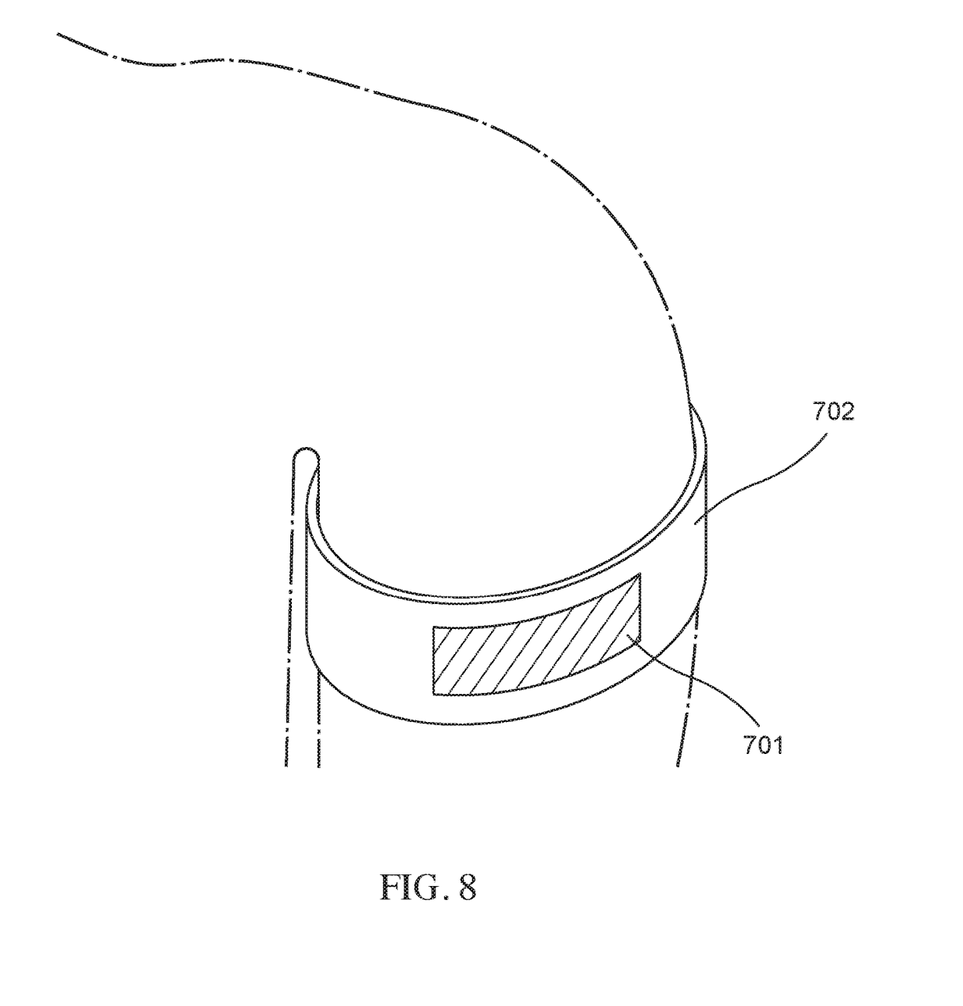
FIG. 8 is a diagram of an individual wearing a substrate with a haptic output device according to an example embodiment.

FIG. 8 is a diagram of an individual wearing a substrate with a haptic output device according to an example embodiment.

Referring to FIG. 5, a haptic output device 501 is attached to, or mounted within, a substrate 502. Substrate 502 can be semi-rigid, or have a desired stiffness to allow haptic output device 501 to vibrate at a specific frequency, e.g., 80 Hz. Substrate 502 can be made of polycarbonate, or carbon fiber. Substrate 502 can have a dimension of about 50 mm by 30 mm by 1 mm. However, example embodiments are not limited thereto. The physical properties (e.g., stiffness) of substrate 502 can dictate the size of substrate 502. Substrate 502 can have a circular curvature having a radius of about 3 cm, about 4 cm, or about 5 cm depending on the joint where substrate 502 is placed.

Haptic output device 501 can be attached to, or mounted within, substrate 502 using an epoxy or other adhesive known in the art. Haptic output device 501 can have an active length of about 28 mm and an active width of about 14 mm. Haptic output device 501 can have a capacitance of about 1.15 nF, and a blocking force of about 195 N, and a free strain of about 1550 ppm. Haptic output device 501 can have an operating voltage of about −(500 V) to about 1500 V.

Referring to FIG. 6, a haptic output device 601 according to an example embodiment can be attached to, or mounted within, a substrate 602 in the form of a cuff having an opening defined by a separation in ends of the cuff. A single haptic output device 601 (as shown) can be used. However, example embodiments are not limited thereto. For example, two or more haptic output devices 601 may be bonded to substrate 602. Substrate 602 in the form of the cuff wraps around a substantial portion of the circumference of the corresponding body part.

Referring to FIG. 7, a substrate 702 according an example embodiment includes a first mounting segment 702A and a second mounting segment 702B. First mounting segment 702A may be over an opposing side of the joint than second mounting segment 702B. However, example embodiments are not limited thereto. First and second mounting segments 702A and 702B may be positioned over any desired region of the joint.

First and second mounting segments 702A and 702B are affixed to each other using adjoining strips 703 so that substrate 702 wraps around an entire circumference of the corresponding body part, as shown in FIG. 8, in the form of a band. Adjoining strips 703 are flexible to conform to different curvatures of the body part. Adjoining strips 703 are adjustable so that substrate 702 can fit around different size body parts (e.g., an arm and a leg). Due to the flexibility and/or adjustability of adjoining strips 703, first and second mounting segments 702A and 702B can actuate independently of each other.

As shown in FIG. 7, a first haptic output device 701A is attached to, or mounted within, first mounting segment 702A. A second haptic output device 701B is attached to, or mounted within, second mounting segment 702B.

Referring back to FIG. 1, haptic output devices 135/137/139 may be piezoelectric actuators or electroactive polymer ("EAP") actuators. In an example embodiment, the piezoelectric actuators may be ceramic actuators or macro-fiber composite ("MFC") actuators. However, example embodiments are not limited thereto. For instance, an electric motor, an electro-magnetic actuator, a voice coil, a shape memory alloy, a solenoid, an eccentric rotating mass motor ("ERM"), a linear resonant actuator ("LRA"), or a high bandwidth actuator may be used in addition to haptic output devices 135/137/139.

Electromechanical actuators are examples of haptic output devices, where a haptic output device is a device including mechanisms configured to output any form of haptic effects, such as vibrotactile haptic effects, electrostatic friction haptic effects, deformation haptic effects, ultrasonic haptic effects, etc., in response to a drive signal.

In an alternative example embodiment, a direct current ("DC") motor may be used, alternatively or in addition, to one or more of haptic output devices 135, 137, 139 to apply the vibration.

Accordingly, in an alternative example embodiment, one or more of electromechanical actuators can be replaced by some other type of haptic output device (not shown) that may be a non-mechanical. That is, the non-mechanical devices can be used in conjunction with electromechanical actuators. Examples of non-mechanical devices include electrodes implanted near muscle spindles to excite the muscle spindles using electrical currents firing at the same rate as sensory stimulations that produce the real (or natural) movement, a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to an individual's body, a device that provides projected haptic output such as a puff of air using an air jet, a laser-based projectile, a sound-based projectile, etc.

According to an example embodiment, the laser-based projectile uses laser energy to ionize air molecules in a concentrated region mid-air so as to provide plasma (a concentrated mixture of positive and negative particles). The laser may be a femtosecond laser that emits pulses at very fast and very intense paces. The faster the laser, the safer for humans to touch. The laser-based projectile may appear as a hologram that is haptic and interactive. When the plasma comes into contact with an individual's skin, the individual may sense the vibrations of energized air molecules in the concentrated region. Sensations on the individual skin are caused by the waves that are generated when the individual interacts with plasma in mid-air. Accordingly, haptic effects may be provided to the individual by subjecting the individual to a plasma concentrated region. Alternatively, or additionally, haptic effects may be provided to the individual by subjecting the individual to the vibrations generated by directed sound energy.

In an example embodiment, the haptic effect applied to the flexible joint of the individual may convey the illusion of flexible joint movement at the flexible joint of the individual without complex movement of the flexible joint. For example, if detector 110 detects the movement-related interaction of throwing a ball, the haptic effect applied proximate to the shoulder, elbow, knuckles and/or wrist joints to the individual creates the perception of the individual throwing a ball without the individual's joints actually going through the complex movement of throwing a ball.

For an individual-interactive event, flexible joint movement of the individual is conveyed to haptic renderer 130 using haptic output devices 135/137/139. Haptic renderer 130 uses the appropriate haptic-rendering algorithms to compute the action/reaction forces of the individual's movement. The force computations are then used to represent the individual's movement in the event.

Haptic system 100 may include a visual display 140 to display the event to the individual when rendering the haptic effect to reinforce the illusion of complex flexible joint movement. The visual display 140 may be a part of a gaming system, a virtual reality/augmented reality system, a sports broadcast system, or a similar system.

Figure 3:
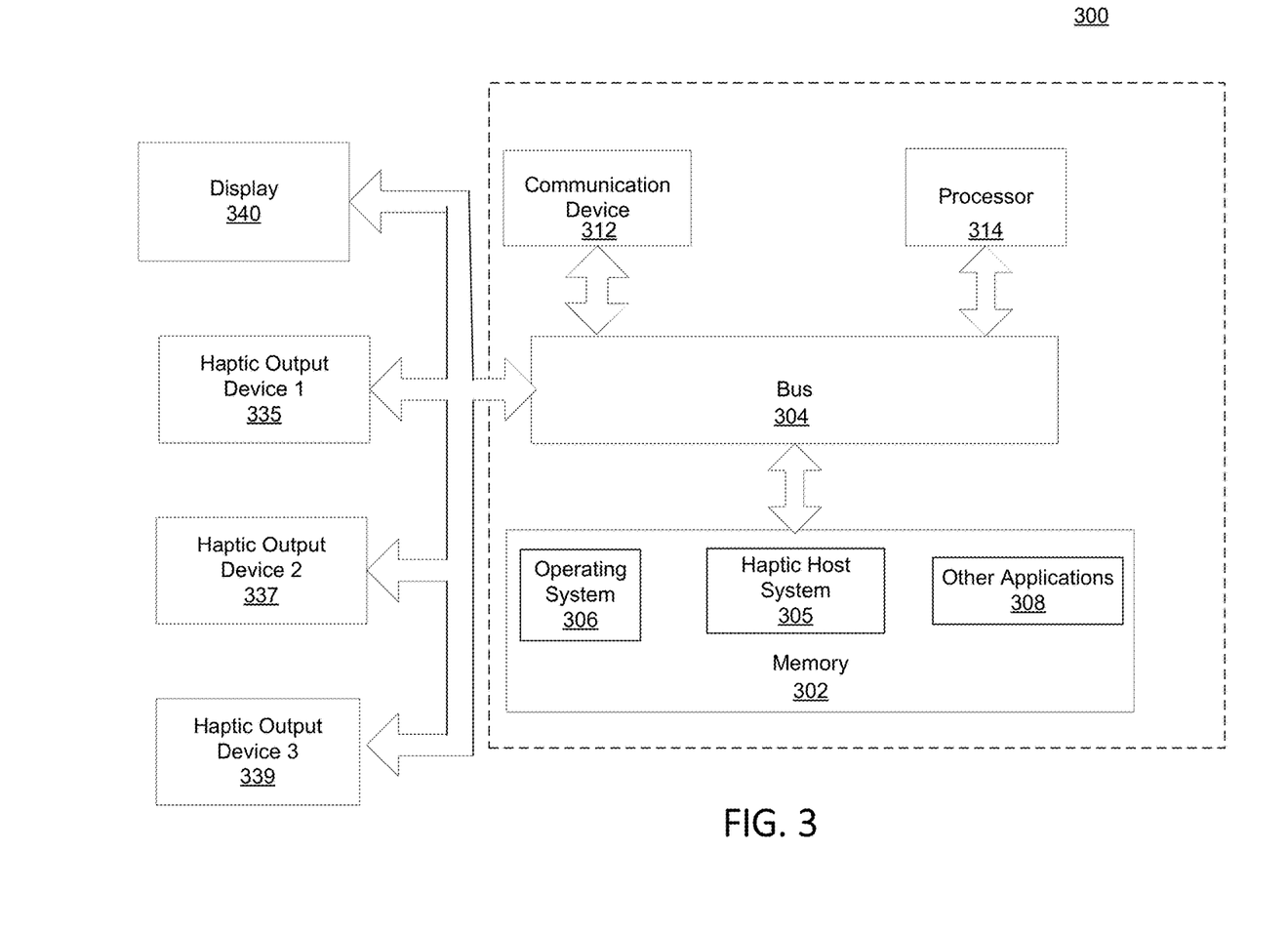
FIG. 3 is a block diagram of a system in a haptically-enabled device according to an example embodiment.

FIG. 3 is a block diagram of a system 300 in a haptically-enabled device according to an example embodiment. Some or all of the components of FIG. 3 can also be used to implement any of the elements of FIG. 1.

Referring to FIG. 3, a system 300 in a haptically-enabled device according to an example embodiment provides haptic functionality for the device.

Although shown as a single system, the functionality of system 300 can be implemented as a distributed system. System 300 includes a bus 304 or other communication mechanism for communicating information, and a processor 314 coupled to bus 304 for processing information. Processor 314 may be any type of general or specific purpose processor. System 300 further includes a memory 302 for storing information and instructions to be executed by processor 314. Memory 302 can be comprised of any combination of random access memory ("RAM"), read only memory ("ROM"), static storage such as a magnetic or optical disk, or any other type of computer-readable medium.

A computer-readable medium may be any available medium that can be accessed by processor 314, and may include both a volatile and nonvolatile medium, a removable and non-removable medium, a communication medium, and a storage medium. A communication medium may include computer readable instructions, data structures, program modules, or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

According to an example embodiment, memory 302 stores software modules that provide functionality when executed by processor 314. The software modules include an operating system 306 that provides operating system functionality for system 300, as well as the rest of the haptically-enabled device. The software modules also include a haptic host system 305 that conveys an illusion of complex flexible joint movement (as described above) and provides haptic functionality. The software modules further include other applications 308, such as, an audio-to-haptic conversion algorithm.

System 300 may further include a communication device 312 (e.g., a network interface card) that provides wireless network communication for infrared, radio, Wi-Fi, or cellular network communications. Alternatively, communication device 312 may provide a wired network connection (e.g., a cable/Ethernet/fiber-optic connection, or a modem).

Processor 314 is further coupled via bus 304 to a visual display 340 (e.g., a light-emitting display ("LED") or a liquid crystal display ("LCD")) for displaying a graphical representation or a user interface to an end-user. Visual display 340 may be a touch-sensitive input device (i.e., a touch screen) configured to send and receive signals from processor 314, and may be a multi-touch touch screen.

System 300 further includes haptic output devices 335/337/339. Processor 314 may transmit a haptic signal associated with a haptic effect to haptic output devices 335/337/339, which in turn outputs haptic effects (e.g., vibrotactile haptic effects or deformation haptic effects).

Figure 4:
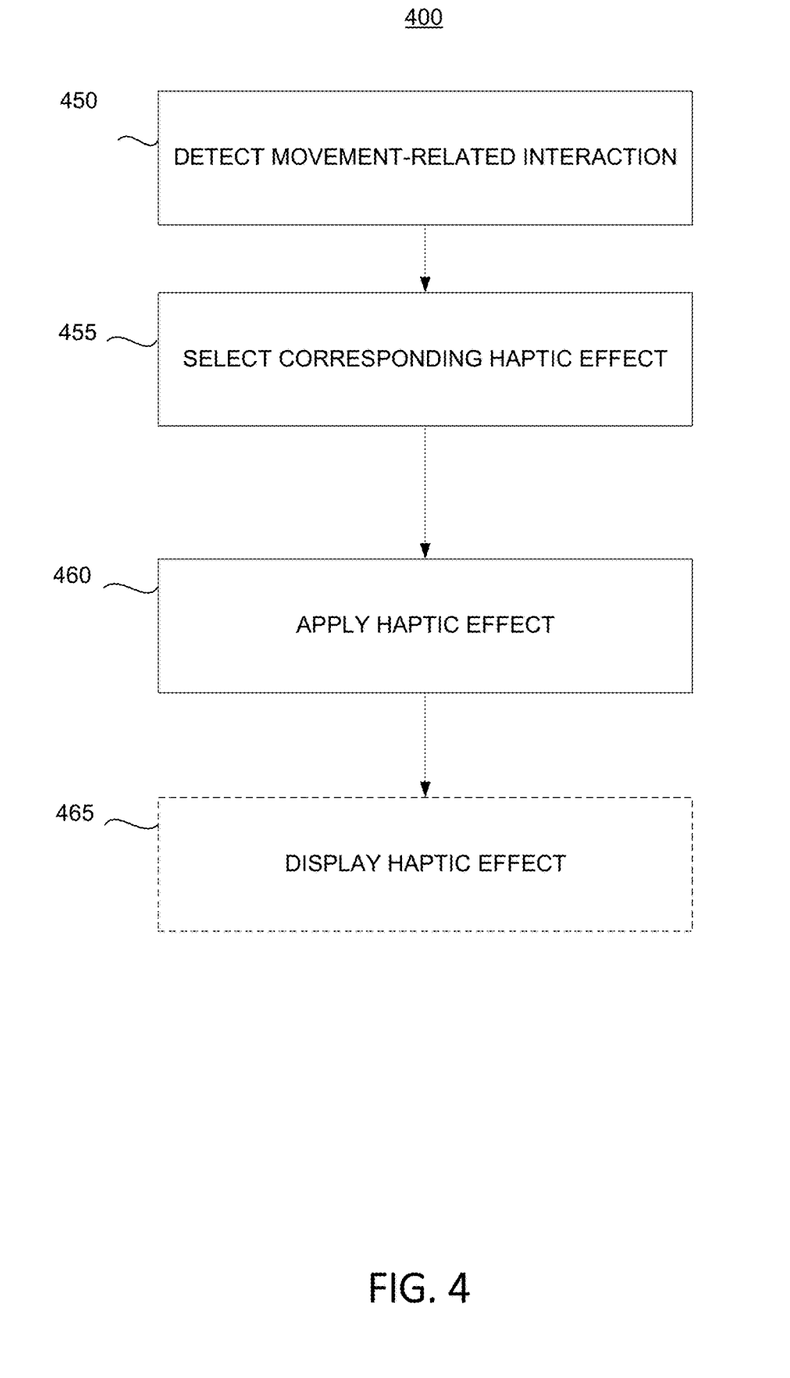
FIG. 4 is a flow diagram of rendering haptics with an illusion of complex flexible joint movement by applying a haptic effect according to an example embodiment.

FIG. 4 is a flow diagram of rendering haptics with an illusion of complex flexible joint movement by applying a haptic effect according to an example embodiment.

Referring to FIG. 4, rendering haptics with an illusion of complex flexible joint movement includes detecting a movement-related interaction that occurs in an event (or environment) at 450, selecting a haptic effect corresponding to the movement-related interaction at 455, and applying the haptic effect proximate to a flexible joint of an individual using a haptic output device at 460.

The detecting of the movement-related interaction, at 450, may include receiving audio and/or visual cues (such as hearing an individual pant while running, or viewing a player being tackled) in the event. The movement-related interaction may be any interaction related to movement such as throwing, kicking, catching, pushing, pulling, being pushed, being pulled, running, reaching, feeling the recoil of firearm, wobbling, etc. The movement-related interactions may be experienced by the individual, a robot, an avatar (a graphical representation of the individual), or combinations thereof.

The selecting of the haptic effect, at 455, may include selecting the haptic effect from a flexible joint haptic effects database. The haptic effect can be a vibrotactile haptic effect, a deformation haptic effect, an electrostatic friction haptic effect, or a combination thereof. The selecting of the haptic effect from the haptic effects database may include synthesizing (or creating) the haptic effect using haptic creation tools in a haptic effects synthesizer. The selecting of the haptic effect may include synthesizing the haptic effect with parameters (e.g., location, magnitude, frequency, duration, etc.) specific for a flexible joint to which the select haptic effect will be applied. The haptic effects may be created in real-time (or simultaneously) as the event occurs, or after the event has occurred.

The synthesizing of the haptic effect may include haptifying the movement-related interactions detected from the audio and/or visual cues by using an audio or visual-to-haptics conversion algorithm, for example, as disclosed in U.S. Pat. No. 9,368,005. According to an example embodiment, only certain portions of the audio and/or visual cues may be haptified rather than entire cue(s). Therefore, example embodiments may use haptic conversion algorithms configured for those portions of the audio and/or visual cues to provide enhanced haptic metadata.

In an alternative or additional example embodiment, the selecting of the haptic effect from the flexible joint haptic effects database may include selecting the haptic effect from a pre-designed haptic effects database (e.g., based on a lookup table of the pre-designed effects stored in the pre-designed haptic effects database). Upon selection, the pre-designed haptic effects can be modified or tuned to more specifically match the event by adding haptic effects, removing unusable haptic effects, or changing (or, editing) at least one parameter of the haptic effects. The modification or tuning may be performed by a haptic editor (a person making an edit to the haptic metadata), haptic modification tools, etc.

The applying of the haptic effect proximate to the flexible joint of the individual, at 460, may include applying a vibration at a frequency of about 80 hertz to about 100 hertz.

The applying of the haptic effect to the flexible joint of the individual, at 460, may include applying a first haptic effect in a first pattern proximate to a first flexible joint of a first limb of the individual, and applying a second haptic effect in a second pattern proximate to a second flexible joint of the first limb of the individual. The first and second haptic effects may collectively convey the illusion of complex flexible joint movement in 3D of the first limb.

The applying of the first haptic effect may overlap, or occur concurrently, with the applying of the second haptic effect. In an alternative example embodiment, the applying of the first haptic effect and the applying of the second haptic effect may be serial.

According to an example embodiment, the haptic effect is applied so as to convey the illusion of complex flexible joint movement at the flexible joint to the individual. In an example embodiment, the haptic effect conveys the illusion of complex flexible joint movement at the flexible joint of the individual without complex movement of the flexible joint.

In an example embodiment, a haptic designer may convey only certain movement-related interactions to the individual rather than all of the movement-related interactions that occur in the event.

In example embodiment, the method of conveying an illusion of complex flexible joint movement may further include displaying the event to the individual using a visual display during the applying of the haptic effect to reinforce the illusion of complex flexible joint movement, at 465.

In an example embodiment, the individual could further be controlling the event with a gamepad.

Example embodiments provide for rendering haptics with an illusion of real (or natural) complex flexible joint movement at a flexible joint of an individual, to create a more immersive experience, without requiring complex movement of the flexible joint.

Example embodiments provide for rendering haptics with an illusion of complex flexible joint movement at a flexible joint of an individual by applying haptic effects that induce nominal flexible joint movement.

According to example embodiments, the illusion of complex flexible joint movement is created without the use of complex and bulky mechanical devices that, for example, may require additional space around the individual to allow for the complex flexible joint movement of the individual.

The foregoing is illustrative of various example embodiments and is not to be construed as limiting thereof. Accordingly, all such modifications are intended to be included within the scope of the disclosure as defined in the claims.

What is claimed is:

1. A haptic system, comprising:
   a detector configured to receive an indication of an event and detect a movement-related interaction in the event; and
   a haptic output device for applying a haptic effect proximate to a flexible joint of an individual, the haptic effect corresponding to the movement-related interaction and being obtained from a flexible joint haptic effects database,
   the haptic effect inducing gait-like movement of the flexible joint,
   the haptic output device including a first haptic output device for applying a first haptic effect in a first pattern proximate to a first muscle of a first flexible joint of the individual, and a second haptic output device for applying a second haptic effect in a second pattern proximate to a second muscle of the first flexible joint of the individual,
   the first and second haptic effects inducing movement of the first flexible joint,
   the first pattern occurring concurrently with, or overlapping, the second pattern.

2. The haptic system of claim 1, wherein the haptic system is a virtual reality system or an augmented reality system.

3. The haptic system of claim 1, wherein the haptic effect is applied at the flexible joint of the individual.

4. The haptic system of claim 1, wherein the haptic effect is applied near the flexible joint of the individual.

5. The haptic system of claim 1, wherein
the first haptic output device is proximate to the first flexible joint on a first limb of the individual,
the haptic output device further includes a third haptic output device proximate to a second flexible joint of the first limb of the individual, the third output device applying a third haptic effect in a third pattern proximate to the second flexible joint of the individual, and
the first and third haptic effects collectively induce movement in three dimensions (3D) of the first limb.

6. The haptic system of claim 5, wherein the first pattern occurs concurrently with, or overlapping, the third pattern.

7. The haptic system of claim 5, wherein the third pattern is sequential to the first pattern.

8. The haptic system of claim 1, wherein
the haptic output device is a piezoelectric actuator or an electroactive polymer (EAP) actuator, and
the piezoelectric actuator is a ceramic actuator or a macro-fiber composite (MFC) actuator.

9. A method of rendering haptics in a haptically-enabled system, comprising:
detecting a movement-related interaction in an event; and
applying a haptic effect proximate to a flexible joint of an individual using a haptic output device, the haptic effect corresponding to the movement-related interaction and being obtained from a flexible joint haptic effects database,
the haptic effect inducing gait-like movement of the flexible joint, and
the applying of the haptic effect including
applying a first haptic effect in a first pattern proximate to a first muscle of a first flexible joint of the individual, and
applying a second haptic effect in a second pattern proximate to a second muscle of the first flexible joint of the individual,
the first and second haptic effects inducing movement of the first flexible joint, and
the first pattern occurring concurrently with, or overlapping, the second pattern.

10. The method of claim 9, wherein the applying of the haptic effect includes applying the haptic effect at the flexible joint of the individual.

11. The method of claim 9, wherein the applying of the haptic effect includes applying a vibration at a frequency of 80 hertz to 100 hertz.

12. The method of claim 9, wherein the applying of the haptic effect includes applying the haptic effect near the flexible joint of the individual.

13. The method of claim 9, wherein the applying of the haptic effect includes
applying the first haptic effect in the first pattern proximate to the first flexible joint of a first limb of the individual, and
applying a third haptic effect in a third pattern proximate to a second flexible joint of the first limb,
wherein the first and third haptic effects collectively induce movement in three dimensions (3D) of the first limb.

14. The method of claim 13, wherein the applying of the first haptic effect overlaps, or occurs concurrently, with the applying of the third haptic effect.

15. The method of claim 13, wherein the applying of the first haptic effect and the applying the third haptic effect occur in series.

16. The method of claim 9, wherein the haptic effect has a frequency between greater than 100 Hz and equal to, or less than, 600 Hz.

17. A non-transitory computer-readable medium having instructions stored thereon that, when executed by a processor, cause the processor to:
detect a movement-related interaction in an event; and
apply, using a haptic output device, a haptic effect proximate to a flexible joint of an individual, the haptic effect corresponding to the movement-related interaction and being obtained from a flexible joint haptic effects database,
the haptic effect inducing gait-like movement of the flexible joint, and
the applying of the haptic effect including
applying a first haptic effect in a first pattern proximate to a first muscle of a first flexible joint of the individual, and
applying a second haptic effect in a second pattern proximate to a second muscle of the first flexible joint of the individual,
the first and second haptic effects inducing movement of the first flexible joint, and
the first pattern occurring concurrently with, or overlapping, the second pattern.

18. The non-transitory computer-readable medium of claim 17, wherein to apply the haptic effect comprises:
apply the first haptic effect in the first pattern proximate to the first flexible joint of a first limb of the individual, and
apply a third haptic effect in a third pattern proximate to a second flexible joint of the first limb,
wherein the first and third haptic effects collectively induce movement in three dimensions (3D) of the first limb.

* * * * *